United States Patent
Hara et al.

(10) Patent No.: US 11,613,252 B2
(45) Date of Patent: Mar. 28, 2023

(54) DRIVING ASSISTANCE SYSTEM AND CONTROL METHOD THEREOF

(71) Applicant: HONDA MOTOR CO., LTD., Tokyo (JP)

(72) Inventors: Yuki Hara, Wako (JP); Hiroshi Yamanaka, Wako (JP); Miki Tsujino, Wako (JP); Yasushi Shoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 262 days.

(21) Appl. No.: 17/099,889

(22) Filed: Nov. 17, 2020

(65) Prior Publication Data
US 2021/0179082 A1 Jun. 17, 2021

(30) Foreign Application Priority Data
Dec. 13, 2019 (JP) .............................. JP2019-225729

(51) Int. Cl.
  *B60W 30/06* (2006.01)
  *B60W 30/095* (2012.01)
  *B60W 50/14* (2020.01)
  *G08G 1/16* (2006.01)
  *B60W 30/09* (2012.01)

(52) U.S. Cl.
  CPC ............ *B60W 30/06* (2013.01); *B60W 30/09* (2013.01); *B60W 30/0956* (2013.01); *B60W 50/14* (2013.01); *G08G 1/168* (2013.01); *B60W 2050/146* (2013.01)

(58) Field of Classification Search
  None
  See application file for complete search history.

(56) References Cited

U.S. PATENT DOCUMENTS

2019/0248414 A1* 8/2019 Ohtani .................. B62D 6/001
2019/0351900 A1* 11/2019 Matsuda ............. B60W 30/143

FOREIGN PATENT DOCUMENTS

| JP | 2015-009646 A | 1/2015 |
| JP | 2018086874 A | 6/2018 |
| JP | 2019-166856 A | 10/2019 |

OTHER PUBLICATIONS

Japanese Office Action for Japanese Patent Application No. 2019-225729 dated Jul. 30, 2021 (partially translated).

* cited by examiner

*Primary Examiner* — Russell Frejd
*Assistant Examiner* — Ana D Thomas
(74) *Attorney, Agent, or Firm* — Thomas Horstemeyer, LLP (57) ABSTRACT

A driving assistance system for a vehicle, comprising: a detection unit configured to detect information regarding surroundings of the vehicle; and a control unit configured to perform driving assistance control based on information detected by the detection unit, wherein, when the control unit performs an operation of stopping movement due to an object detected by the detection unit during the driving assistance control, the control unit restarts the movement after a predetermined time elapses from when the stop operation is started.

10 Claims, 7 Drawing Sheets

| VEHICLE STATE (SHIFT POSITION) | DETECTION UNIT CARRYING OUT DETECTION |
|---|---|
| DRIVE RANGE (RUNNING) | FORWARD |
| DRIVE RANGE (STOPPED) | SIDE |
| PARK RANGE | — |
| NEUTRAL RANGE | — |
| REVERSE RANGE (RUNNING) | BACKWARD |
| REVERSE RANGE (STOPPED) | SIDE |

FIG. 7B

DRIVING ASSISTANCE SYSTEM AND CONTROL METHOD THEREOF

CROSS-REFERENCE TO RELATED APPLICATION(S)

This application claims priority to and the benefit of Japanese Patent Application No. 2019-225729 filed on Dec. 13, 2019, the entire disclosure of which is incorporated herein by reference.

BACKGROUND OF THE INVENTION

Field of the Invention

The present invention relates to a vehicle control technique.

Description of the Related Art

Automatic start-to-follow control is known as a type of driving assistance control of a vehicle. Japanese Patent Laid-Open No. 2018-86874 discloses that, in automatic start to follow a preceding car, when a moving obstacle such as a pedestrian or a two-wheeler that is approaching the vehicle is detected, automatic start-to-follow control is canceled, and a stopped state is maintained until the driver performs an operation of showing his or her intention to start.

Japanese Patent Laid-Open No. 2018-86874 discloses maintaining of the stopped state when a moving obstacle is detected during a driving assistance control operation. However, starting the vehicle after the stopped state requires a driver's operation, and resuming an operation that is performed by the system is not disclosed.

In view of this, the present invention provides a technique for making it possible for a system to restart a driving assistance control operation, from a stopped state after a moving obstacle is detected during the driving assistance control operation that is performed by the system.

SUMMARY OF THE INVENTION

According to one aspect of the present invention, there is provided a driving assistance system for a vehicle, comprising: a detection unit configured to detect information regarding surroundings of the vehicle; and a control unit configured to perform driving assistance control based on information detected by the detection unit, wherein, when the control unit performs an operation of stopping movement due to an object detected by the detection unit during the driving assistance control, the control unit restarts the movement after a predetermined time elapses from when the stop operation is started.

DESCRIPTION OF THE EMBODIMENTS

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Vehicle Configuration

Figure 1:
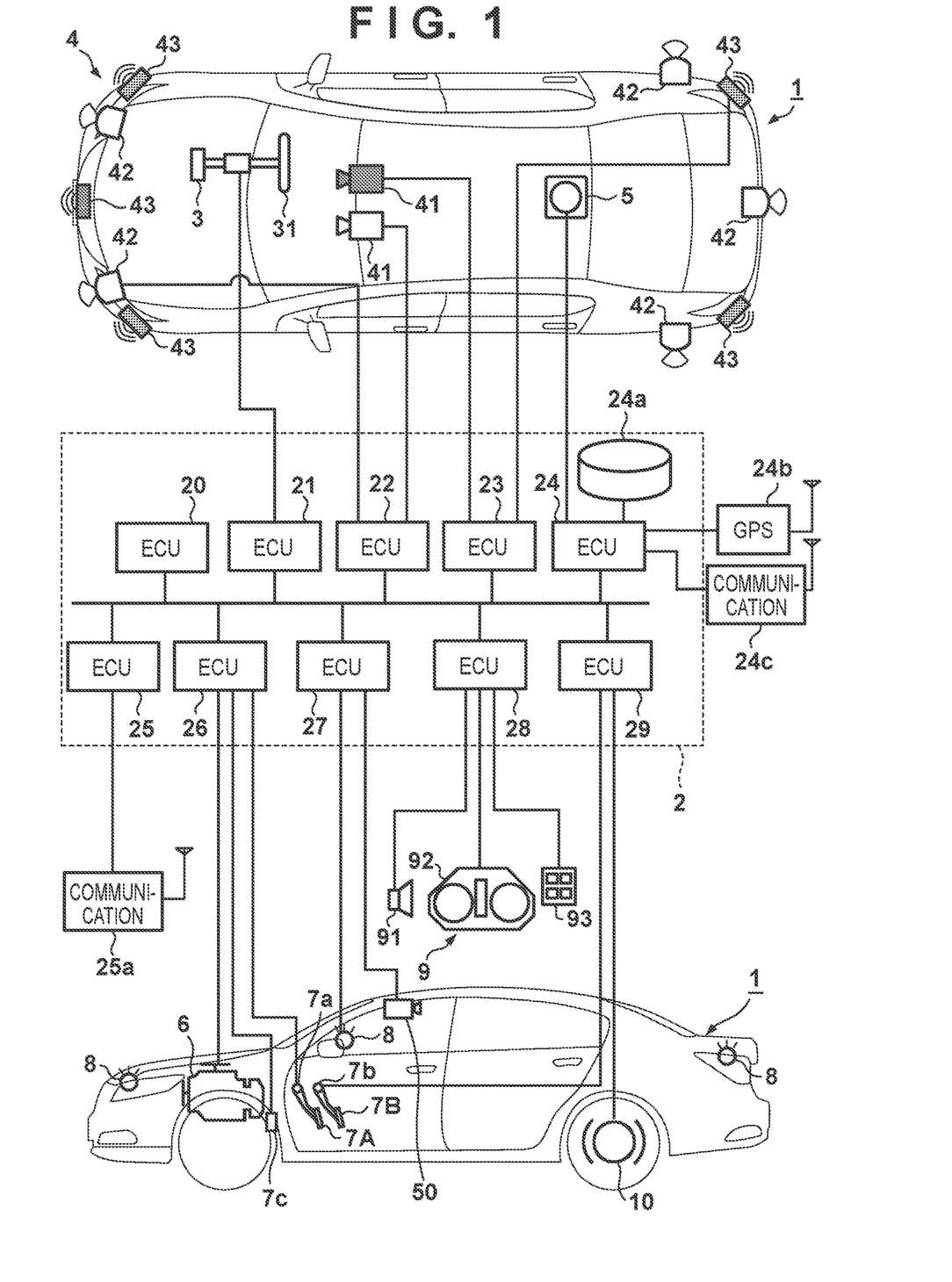
FIG. 1 is a block diagram showing a vehicle control apparatus according to an embodiment of the present invention.

FIG. 1 is a block diagram of a vehicle control apparatus according to an embodiment of the present invention, which controls a vehicle 1. FIG. 1 schematically shows the vehicle 1 in a plan view and a side view. A sedan-type four-wheel passenger car is an example of the vehicle 1.

The control apparatus in FIG. 1 includes a control system 2. The control system 2 includes a plurality of ECUs 20 to 29 connected thereto so as to enable communication using an in-vehicle network. Each of the ECUs functions as a computer that includes a processor represented by a CPU, a storage device such as a semiconductor memory, an interface to an external device, and the like. The storage device stores programs that are executed by the processor, data that is used for processing by the processor, and the like. Each ECU may also include a plurality of processors, a plurality of storage devices, a plurality of interfaces, and the like.

Functions respectively assigned to the ECUs 20 to 29, and the like will be described below. Note that the number of ECUs and the assigned functions can be designed as appropriate, and they can be broken into smaller pieces than this embodiment, or can be integrated.

The ECU 20 executes control related to automated driving of the vehicle 1. In automated driving, at least one of steering and acceleration/deceleration of the vehicle 1 is automatically controlled. In a control example to be described later, both steering and acceleration/deceleration are automatically controlled.

The ECU 21 controls an electronic power steering apparatus 3. The electronic power steering apparatus 3 includes a mechanism for steering front wheels according to a driver's driving operation (steering operation) on a steering wheel 31. The electronic power steering apparatus 3 also includes a motor that exerts drive force for assisting a steering operation or automatically steering the front wheels, a sensor that detects a steering angle, and the like. When the driving state of the vehicle 1 is an automated driving state, the ECU 21 automatically controls the electronic power steering apparatus 3 according to an instruction from the ECU 20, and controls the direction of forward movement of the vehicle 1. The ECU 21 also performs control for maintaining the steering angle when the vehicle 1 is stopped, when there is a switch between the operation performer, and the like.

The ECUs 22 and 23 control detection units 41 to 43 that detect the situation surrounding the vehicle, and perform information processing on their detection results. Each detection unit 41 is a camera for shooting an image ahead of the vehicle 1 (which may hereinafter be referred to as "camera 41"), and, in this embodiment, is installed at a roof front part and on an interior side of the front window. By analyzing an image shot by a camera 41, it is possible to extract the contour of an object and a demarcation line (white line, for example) of a traffic lane on a road.

Each detection unit 42 is a LIDAR (Light Detection and Ranging, may hereinafter be referred to as "LIDAR 42"), detects an object in the surroundings of the vehicle 1, and measures the distance from an object. In this embodiment, five LIDARs 42 are provided, two of the five LIDARs 42 being provided at the respective front corners of the vehicle 1, one at the rear center, and two on the respective sides at the rear. Each detection unit 43 is a millimeter-wave radar (which may hereinafter be referred to as "radar 43"), detects an object in the surroundings of the vehicle 1, and measures the distance from an object. In this embodiment, five radars 43 are provided, one of the radars 43 being provided at the front center of the vehicle 1, two at the respective front corners, and two at the rear corners. Furthermore, although not illustrated in FIG. 1, the vehicle 1 may include sonars that use sound waves, along with the detection units 43. A plurality of sonars are installed at positions at which an object in front of the vehicle 1, objects to the sides of the vehicle 1, and an object behind the vehicle 1 are detected, and can be used for parking assistance control, for example.

The ECU 22 controls one camera 41 and the LIDARs 42, and performs information processing on their detection results. The ECU 23 controls the other camera 41 and the radars 43, and performs information processing on their detection results. Also, the ECUs 22 and 23 generate an image of the surroundings of the vehicle based on image data obtained by the cameras 41. Here, the image of the surroundings may be a perspective image corresponding to a planar view of the vehicle and the surroundings of the vehicle, or a bird's-eye image corresponding to a three-dimensional image of the vehicle and the surroundings of the vehicle in the direction of its forward movement when viewed from above, for example. By providing two sets of apparatuses that detect the surrounding situation of the vehicle, the reliability of detection results can be improved, and by providing detection units of different types such as cameras, LIDARs, radars, and sonars, the surrounding environment of the vehicle can be multilaterally analyzed.

The ECU 24 controls a gyro sensor 5, a GPS sensor 24b, and a communication apparatus 24c, and performs information processing on their detection results or communication results. The gyro sensor 5 detects rotary movement of the vehicle 1. A course of the vehicle 1 can be determined based on a detection result of the gyro sensor 5, a wheel speed, and the like. The GPS sensor 24b detects the current position of the vehicle 1. The communication apparatus 24c wirelessly communicates with a server that provides map information and traffic information, and acquires such information. The ECU 24 can access a database 24a of map information built in a storage device, and the ECU 24 searches for a route from the current location to a destination, and the like.

The ECU 25 includes a communication apparatus 25a for inter-vehicle communication. The communication apparatus 25a wirelessly communicates with another vehicle in the surroundings thereof, and exchanges information with the vehicle.

The ECU 26 controls a power plant 6. The power plant 6 is a mechanism for outputting drive force for rotating the drive wheels of the vehicle 1, and includes an engine and a transmission, for example. For example, the ECU 26 controls output of the engine in accordance with a driver's driving operation (an accelerator operation or an accelerating operation) detected by an operation detection sensor 7a provided on an accelerator pedal 7A, and switches the gear stage of the transmission based on information regarding the vehicle speed detected by a vehicle speed sensor 7c. The number of gear stages of the transmission and the type of each gear stage are not particularly limited. Examples of shift positions include a Park (P) range, a Reverse (R) range, a Neutral (N) range, and a Drive (D) range. When the driving state of the vehicle 1 is a manual driving state, the shift position is switched through an operation on a shift lever (not illustrated). When the driving state of the vehicle 1 is an automated driving state, the ECU 26 automatically controls the power plant 6 in accordance with an instruction from the ECU 20, and controls the acceleration/deceleration of the vehicle 1.

The ECU 27 controls lighting devices (lights such as headlights and taillights) that include direction indicators 8 (blinkers). In the example in FIG. 1, direction indicators 8 are provided on door mirrors, at the front, and at the rear of the vehicle 1.

The ECU 28 controls an input/output apparatus 9. The input/output apparatus 9 outputs information to the driver, and receives information from the driver. An audio output apparatus 91 notifies the driver of information using sound (message). A display apparatus 92 notifies the driver of information through image display. The display apparatus 92 is installed in front of the driver's seat, for example, and constitutes an instrument panel, or the like. Note that, here, sound and display are illustrated, but information may be notified using vibration and light. In addition, information may also be notified using a combination of some of sound, display, vibration, and light. Furthermore, the combination or a notification aspect may be different according to the level of information to be notified (for example, an emergency level).

Input apparatuses 93 are a group of switches arranged at positions so as to enable the driver to perform an operation on the switches to give an instruction to the vehicle 1, but may include an audio input apparatus. The configuration of the group of switches that constitute the input apparatuses 93 may be set in accordance with the functions of the vehicle 1. In addition, in this embodiment, a touch panel display that displays various images generated by the ECUs 22 and 23 is provided as the input apparatus 93.

The ECU 29 controls a brake apparatus 10 and a parking brake (not illustrated). The brake apparatus 10 is, for example, a disk brake apparatus, is provided for each of the wheels of the vehicle 1, and decelerates or stops the vehicle 1 by imposing resistance to rotation of the wheels. The ECU 29 controls activation of the brake apparatus 10, for example, in accordance with a driver's driving operation (brake operation) detected by an operation detection sensor 7b provided on a brake pedal 7B. When the driving state of the vehicle 1 is an automated driving state, the ECU 29 automatically controls the brake apparatus 10 in accordance with an instruction from the ECU 20, and controls deceleration and stop of the vehicle 1. The brake apparatus 10 and the parking brake can also be activated to maintain a stopped state of the vehicle 1. In addition, if the transmission of the power plant 6 includes a parking lock mechanism, this can also be activated in order to maintain a stopped state of the vehicle 1.

The vehicle 1 further includes in-vehicle detection unit 50 that detects the state inside the vehicle. Here, the in-vehicle detection unit 50 is constituted by a camera that is an image capture unit, a weight sensor, a temperature detection sensor, and the like, and the type thereof is not particularly limited. Note that the in-vehicle detection unit 50 may be provided for each of the seats in the vehicle 1, or may also be provided as a single structure so as to make it possible to view the entire vehicle interior from a higher perspective, and monitor it.

Exemplary Control Functions

Control functions of the vehicle 1 according to this embodiment include running-related functions related to control of driving, braking, and steering of the vehicle 1, and notification functions related to notification of information to the driver.

Examples of the running-related functions include lane keep control, lane departure mitigation control (off-road departure mitigation control), lane change control, preceding vehicle follow control, collision-reducing braking control, erroneous start suppression control, and parking assistance control. The notification functions include close vehicle notification control, preceding vehicle start notification control, and nearby object notification control. In addition, the notification functions may be performed using sound, an image, a video image, or the like, or may also be performed using a combination thereof.

Lane keep control is a type of control of the position of a vehicle relative to a traffic lane, and is control for causing a vehicle to automatically (independently of a driver's driving operation) run on a running path set within a traffic lane. Lane departure mitigation control is a type of control of the position of a vehicle relative to a traffic lane, and is control for detecting a white line or center median, and automatically performing steering while preventing the vehicle from moving beyond the line. Lane departure mitigation control and lane keep control are functions different in this manner.

Lane change control is control for automatically moving a vehicle from a traffic lane on which the vehicle is running to a neighboring traffic lane. Preceding vehicle follow control is control for automatically following a vehicle running ahead. Collision mitigation braking control is control for assisting collision avoidance by automatically braking the vehicle when the likelihood of collision with an obstacle in front of the vehicle increases. Erroneous start suppressing control is control for limiting acceleration of a vehicle when the vehicle is in a stopped state and a driver's accelerating operation is higher than or equal to a predetermined amount, thereby preventing sudden start.

Parking assistance control is control for identifying a movement route for a specified region (stop position), and automatically moving the vehicle 1 into a stopped state. According to this embodiment, entering control from a position at which the vehicle is running to a parking position, and exiting control for moving a vehicle from a parking position to a position at which the vehicle can run will be described as parking assistance control.

Close vehicle notification control is control for notifying the driver of existence of a vehicle running on a neighboring traffic lane, and, for example, the driver of the vehicle is notified of existence of another vehicle running to a side of or behind the vehicle. Preceding vehicle start notification control is control for performing a notification that a preceding vehicle has started when the vehicle and another vehicle in front of the vehicle were in a stopped state. Nearby object notification control is notification control that is performed when an object is detected near the vehicle. The detection range here may be directed to an object that is in a range in which the vehicle is envisioned to be positioned (to move), according to the direction of forward movement of the vehicle and the control content at this time point. Such notification can be performed by the above-described in-vehicle notification devices.

Display Example

Figure 2:
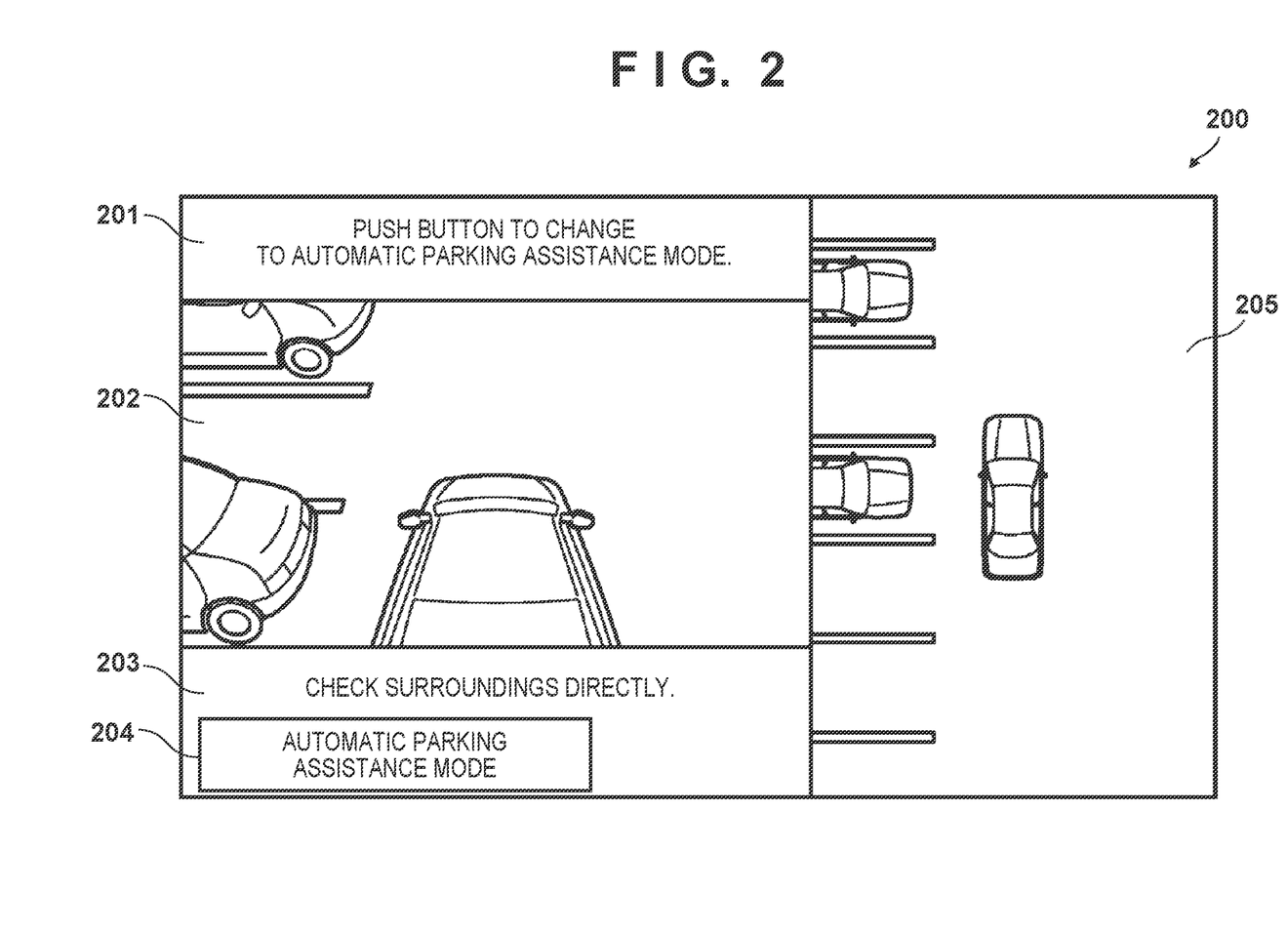
FIG. 2 is a diagram showing a configuration example of a display screen according to an embodiment of the present invention.

FIG. 2 shows a configuration example of a screen that is displayed on the touch panel display included in the input apparatus 93 of the vehicle 1 of this embodiment. According to this embodiment, a perspective image and a bird's-eye image generated by the ECUs 22 and 23 based on images shot by the cameras 41 are displayed.

Ina screen 200, a message is displayed in a region 201. A bird's-eye image in which the vehicle 1 is positioned at the center is displayed in a region 202. In the region 202, the displayed image may be switched in accordance with the direction of movement (forward movement, backward movement). In a region 203, a button for receiving a user's operation is provided in addition to a message. According to this embodiment, in the region 203, a button 204 for executing parking assistance is provided. Note that the button 204 for executing automatic parking may also be provided as a switch out of a group of switches constituting the input apparatus 93, instead of the button on the touch panel display. In a region 205, a perspective image in which the vehicle 1 is positioned at the center is displayed.

Note that parking assistance control will be described below as an example of driving assistance control, but there is no limitation thereto. As other driving assistance control, the present invention can be applied when the vehicle 1 (system) is performing control and operating. In addition, regarding driving assistance control to be described later, operation assistance control such as maintenance of a stopped state is also collectively referred to as driving assistance control.

Operation Overview

Figure 3A:
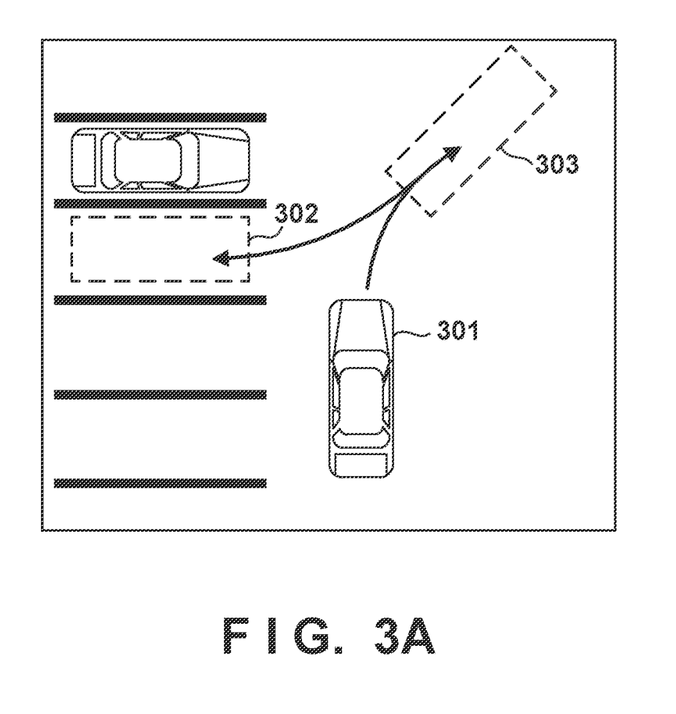
FIGS. 3A and 3B are diagrams for illustrating operations in parking assistance control according to an embodiment of the present invention.
Figure 3B:
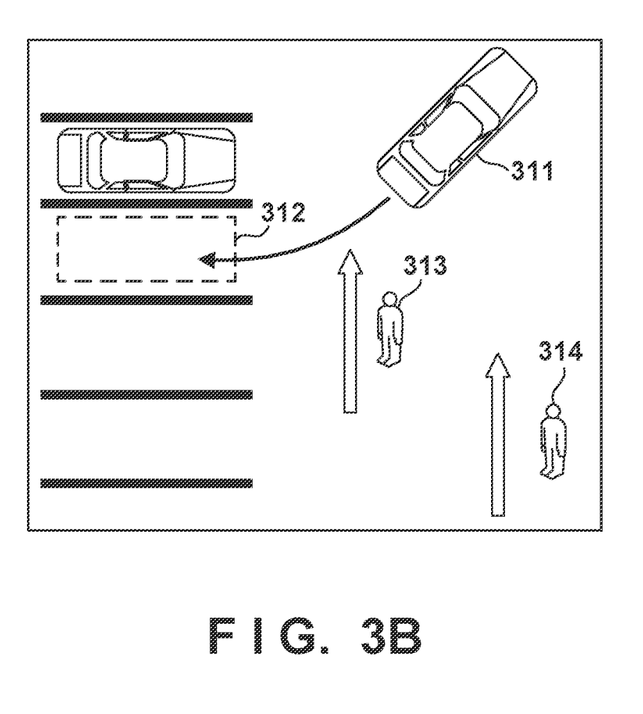

FIGS. 3A and 3B are diagrams for illustrating an operation overview when parking assistance control is performed as an example of driving assistance control according to this embodiment. FIG. 3A shows a state where, in a parking lot or the like, a vehicle 301 recognizes a parking position based on detection results of the surroundings of the vehicle obtained by the detection units 41 to 43, and starts entering control in accordance with a driver's instruction. The arrows in FIG. 3A indicate a path of the vehicle 1 in entering control, and this is calculated by the control system 2. In addition, a region 303 indicates a position at which the vehicle 301 makes a turn when entering control is performed.

FIG. 3B shows a state where the vehicle moved out of the state shown in FIG. 3A to a region 303 in which a turn is to be made. Subsequently, a vehicle 311 starts reversing toward a parking region 312. Assume that, at this time, a person 313 and a person 314, which are moving objects, are respectively moving in the directions of the blank arrows. The person 313 is present at a position closer to the vehicle 311, and is also positioned in the direction of forward movement of the vehicle 311. Assume that the vehicle 311 recognizes the existence of the person 313 and the person 314 based on detection results of the detection units 41 to 43, but, here, the vehicle 311 stops moving due to the existence of the person 313 that is closer.

Thereafter, after a predetermined time has elapsed since a stopped state started, the vehicle 311 restarts moving. If some obstacle is detected in the direction of forward movement again after the vehicle 311 restarted moving, the vehicle state changes to a stopped state. That is to say, a configuration is adopted in which, when parking assistance control is being performed, and a plurality of obstacles of some type to the operation are detected, the vehicle is stopped based on the first detection, and, after a predetermined time has elapsed from this point in time, parking assistance control is restarted again independently of a driver's operation.

Note that the vehicle 311 may enter, through different types of control, the stopped state (first stopped state) of stopping due to the person 313 being detected and the stopped state (second stopped state) of stopping when parking assistance control is restarted after the first stopped state and some type of obstacle is detected again. For example, the first stopped state may involve stopping control in which both a stopping time when turning control of parking assistance control is performed and a stopping time for an obstacle being detected are taken into consideration. On the other hand, the second (or second time onward) stopped state may be performed through braking control for normal collision avoidance. Furthermore, the second (or the second time onward) stopped state may be executed through braking control that is based on the assumption that a passenger (for example, the driver) is monitoring the surroundings. Specifically, control may also be performed so as to decrease thresholds for the distance between the vehicle and the obstacle and a time that is an indication of collision, the thresholds being used when stopping the vehicle, assuming that a passenger is monitoring the surroundings.

In the example in FIG. 3B, when a stopped state is entered in accordance with the vehicle 311 detecting the person 313, and after a certain period of time (stopping time) then elapses, the vehicle starts moving through autonomous parking assistance control. The predetermined time here may be three or five seconds, for example. At this time, if an obstacle (for example, the person 314) is detected in the surroundings again, the vehicle state changes to a stopped state. However, even if the person 314 is detected within the certain period of time after the person 313 is detected (when the vehicle is stopped), control for accumulating stopped times is not performed. Note that, as described above, control may be performed such that a stopped time in the first stopped state and a stopped time in the second (or the second time onward) stopped state are different.

Processing Flow

Figure 4:
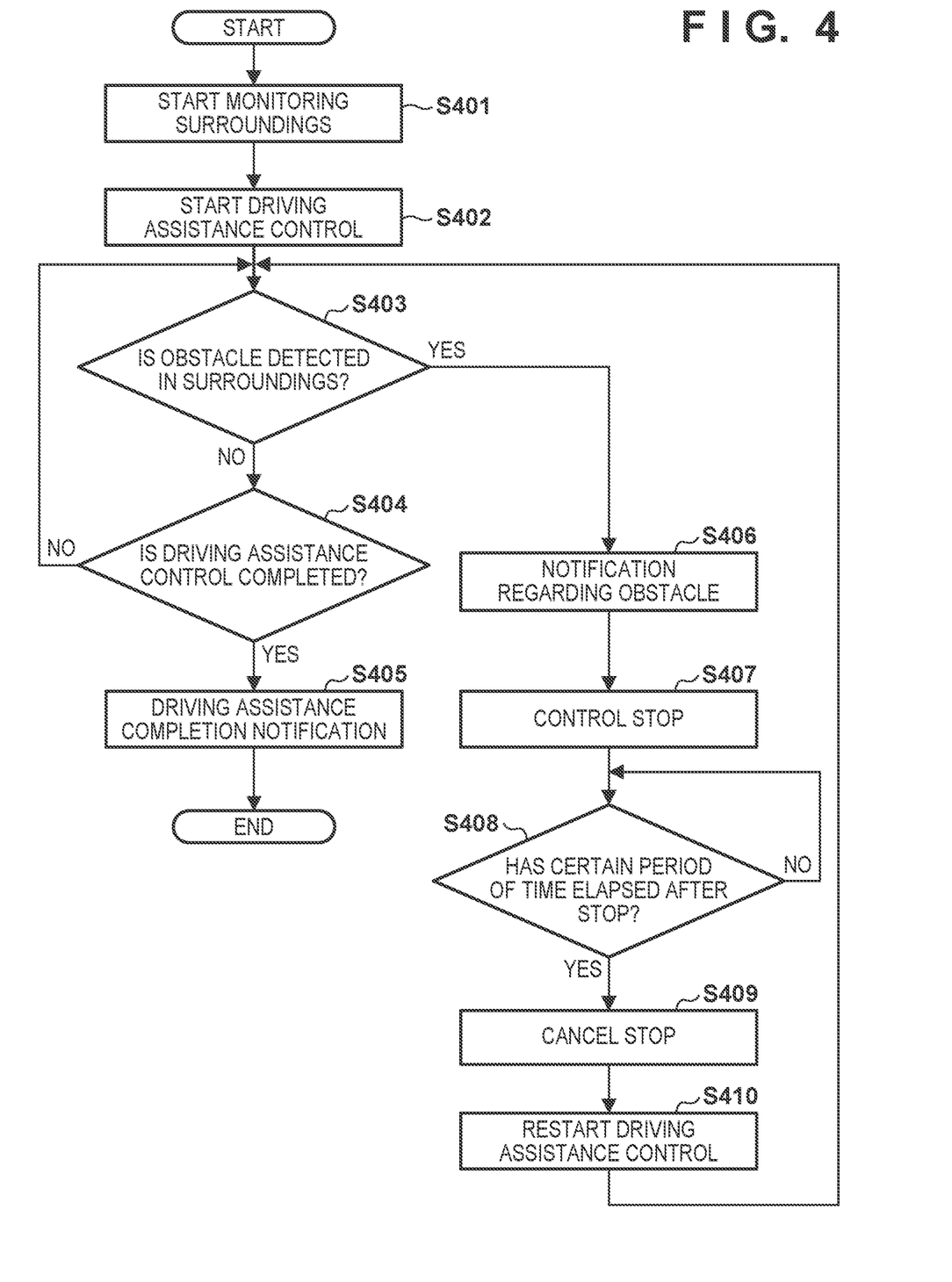
FIG. 4 is a flowchart of control processing according to an embodiment of the present invention.

FIG. 4 is a flowchart of processing that is performed when driving assistance control according to this embodiment is performed. In this processing flow, for example, assume that ECUs of the vehicle 1 perform processing in cooperation, and, here, in order to simplify the description, assume that the control system 2 that operates as a driving assistance system, representing the ECUs comprehensively, performs the processing. This processing flow represents processing that is executed when one of the above-described various types of driving assistance control is being performed.

In step S401, the control system 2 starts monitoring the surroundings of the vehicle 1 using the detection units 41 to 43. Note that the surroundings may also start to be monitored before this step. In addition, the type of each detection unit, the number of detection units, and which part of a detection unit are used for monitoring the surroundings, and the like, may change in accordance with the content of driving assistance control that is carried out. In addition, in this embodiment, assume that, when driving assistance control is being performed, the driver or the like is monitoring the surroundings.

In step S402, the control system 2 starts driving assistance control. Driving assistance control that is started here is started based on an instruction from the driver or the like. In this embodiment, parking assistance control will be described as an example.

In step S403, the control system 2 determines, based on detection results by the detection units 41 to 43, whether or not an object that can be an obstacle to driving assistance control has been detected in the surroundings of the vehicle 1. Examples of the obstacle include another vehicle (including an automobile, a two-wheeler, a bicycle, etc.) and a moving object such as an animal in addition to a person such as those shown in FIGS. 3A and 3B. If an obstacle is detected (YES in step S403), the procedure advances to step S406, and if no obstacle is detected (NO in step S403), the procedure advances to step S404.

In step S404, the control system 2 determines whether or not driving assistance control is complete. For example, when the driving assistance control is parking assistance control, it is determined that driving assistance control is complete when the vehicle 1 reaches a parking position, and enters a stopped state. When driving assistance control is complete (YES in step S404), the procedure advances to step S405, and if driving assistance control is not complete (NO in step S404), the procedure returns to step S403, and driving assistance control continues.

In step S405, the control system 2 informs the driver that driving assistance control is complete. As the informing method here, for example, display may be performed on the touch panel display included in the input apparatus 93, or a notification may be performed using sound or the like. This processing flow is then ended.

In step S406, the control system 2 notifies the driver of information regarding the detected obstacle. The notification content here will be described later with reference to FIG. 5.

In step S407, the control system 2 suspends driving assistance control, and changes the vehicle state to a stopped state. At this time, regarding steering, the control system 2 performs control so as to maintain the state when driving assistance control is suspended. In addition, information regarding the control state immediately before driving assistance control is suspended may be held. In addition, in the stopped state here, although movement (acceleration/deceleration control) is suspended, steering control may be continuously executable in consideration of an operation to be performed when driving assistance control is restarted.

In step S408, the control system 2 determines whether or not a certain period of time has elapsed after the vehicle state changed to the stopped state in step S407. The certain period of time here has been determined in advance, and may be three or five seconds, for example. If the certain period of time has elapsed (YES in step S408), the procedure advances to step S409, and if it has not elapsed (NO in step S408), the control system 2 waits until it elapses. Note that, here, the timing when the vehicle state changed to the stopped state is set as a start point of timekeeping, but there is no limitation thereto, and, for example, the timing when an obstacle is detected may also be set as a start point of timekeeping. In addition, a configuration may also be adopted in which, when stopping control is being performed, the remaining time until driving assistance control is restarted is notified to the driver.

In step S409, the control system 2 cancels the stopped state, and enters a state where driving assistance control can be restarted.

In step S410, the control system 2 restarts driving assistance control. The procedure then returns to step S403, and driving assistance control continues.

Exemplary Detection Range

Figure 5:
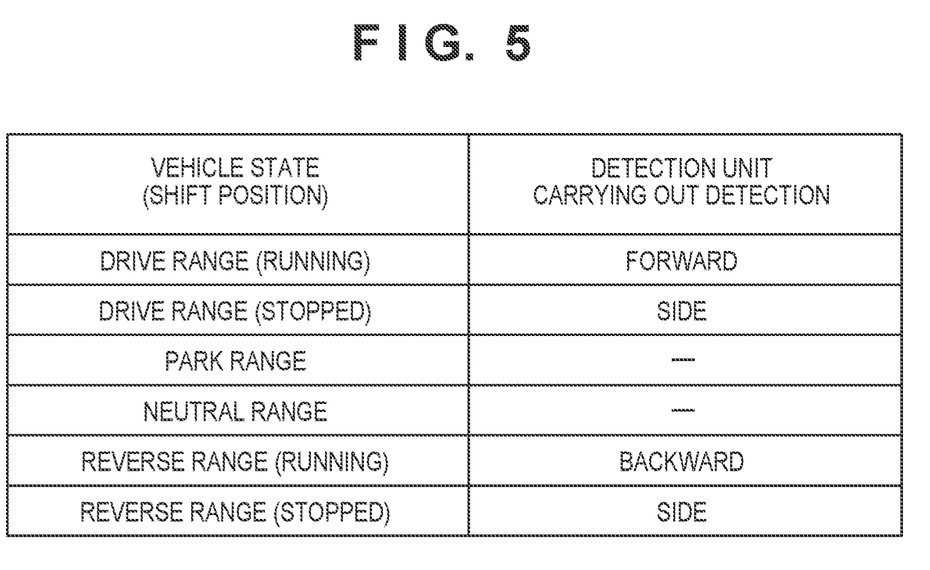
FIG. 5 is a diagram for illustrating the relationship between a vehicle state and a detection unit according to an embodiment of the present invention.

FIG. 5 shows the relationship between a range in which a detection unit performs detection and a shift position of the vehicle 1, the relationship being seen when the processing shown in FIG. 4 is performed. The vehicle 1 according to this embodiment can perform various types of driving assistance control, and the shift position is switched in accordance with the content of the driving assistance control. As a result of the shift position being switched, the direction of forward movement and the control state are switched, and thus, according to this embodiment, the direction in which the detection unit performs detection is switched in accordance with the shift position. That is to say, obstacle detection determination in step S403 in FIG. 4 is performed based on a detection result by a corresponding detection unit. Note that, as described above, the vehicle 1 according to this embodiment includes cameras, LIDARs, radars, sonars, and the like as detection units. Here, at least detection of the surroundings of the vehicle 1 is performed by a camera, but another detection unit may also be used in combination.

When the shift position is in the Drive range, and the vehicle 1 is running, detection determination for a moving object (obstacle) is performed based on a detection result obtained by the detection unit that monitors the situation in front of the vehicle. In addition, when the shift position is in the Drive range, and the vehicle 1 is stopped, detection determination for a moving object (obstacle) is performed based on detection results obtained by the detection units that monitor the situations to the sides of the vehicle.

When the shift position is in the Park range or Neutral range, the vehicle 1 does not move, and thus there is no need to monitor the surroundings.

When the shift position is in the Reverse range, and the vehicle 1 is running, detection determination for a moving object (obstacle) is performed based on a detection result obtained by the detection unit that monitors the situation behind the vehicle. Also, when the shift position is in the Reverse range, and the vehicle 1 is stopped, detection determination for a moving object (obstacle) is performed based on detection results by the detection units that monitor the situations to the sides of the vehicle.

Notification Example

FIGS. 6A to 7B are diagrams for illustrating a notification example when a moving object is detected in the surroundings of the vehicle 1 when processing shown in FIG. 4 is being performed. Here, a notification method that uses the region 205 in the screen 200 shown in FIG. 2 will be described.

Figure 6A:
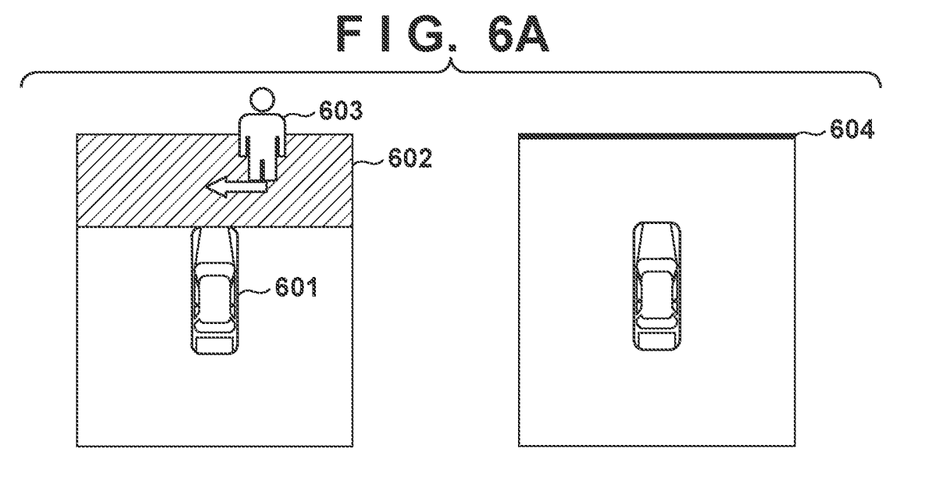
FIGS. 6A to 6C are diagrams for illustrating a notification example that is based on a detection result according to an embodiment of the present invention.

FIG. 6A shows a situation in which a moving object 603 is detected in a detection region 602 when the detection unit is monitoring the situation in front of a vehicle 601. In this case, an icon 604 indicating the detection direction is displayed on the touch panel display.

Figure 6B:
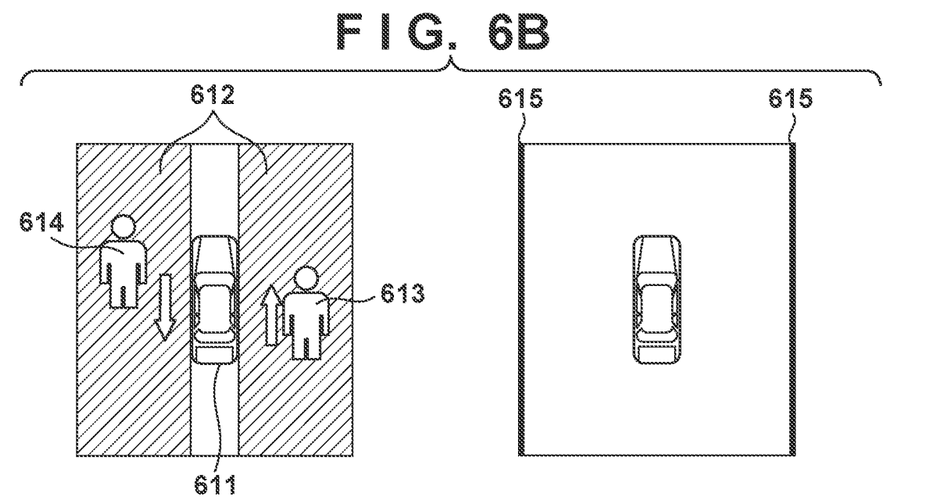

FIG. 6B shows a situation in which moving objects 613 and 614 are detected in a detection region 612 when the detection units are monitoring the situation to the sides of a vehicle 611. In this case, icons 615 indicating the detection direction are displayed on the touch panel display.

Figure 6C:
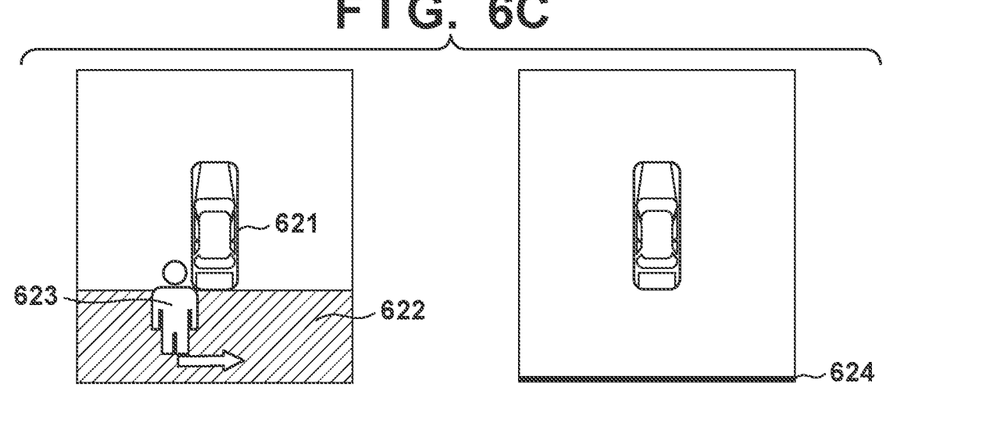

FIG. 6C shows a situation in which a moving object 623 is detected in a detection region 622 when the detection unit is monitoring the traffic behind a vehicle 621. In this case, an icon 624 indicating the detection direction is displayed on the touch panel display.

Figure 7A:
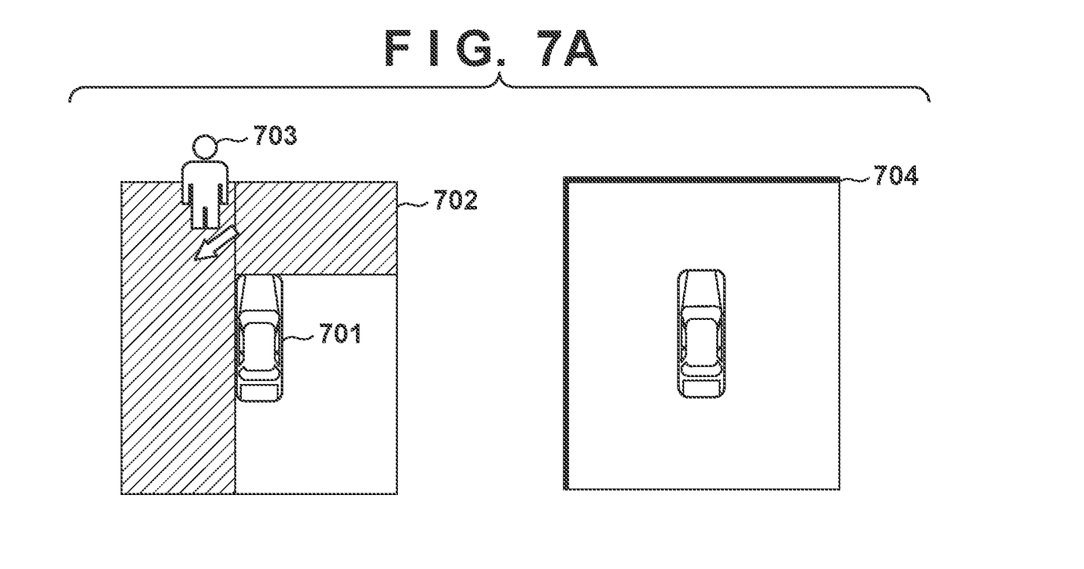
FIGS. 7A and 7B are diagrams for illustrating a notification example that is based on a detection result according to an embodiment of the present invention.

FIG. 7A shows a situation in which a moving object 703 moving between a front region and a side region is detected when a detection unit is monitoring the surroundings of a vehicle 701. In this case, an icon 704 indicating the forward direction and side direction is displayed on the touch panel display.

Figure 7B:
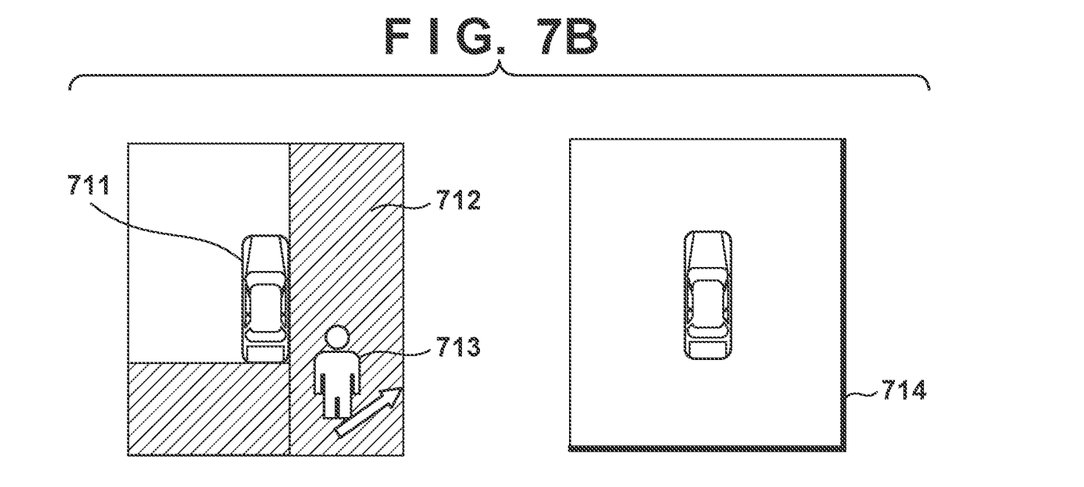

FIG. 7B shows a situation in which a moving object 713 moving between a rear region and a side region is detected when a detection unit is monitoring the surroundings of a vehicle 711. In this case, an icon 714 indicating the backward direction and side direction is displayed on the touch panel display.

Note that, in FIGS. 6A to 7B, linear icon display is used for notification, but there is no limitation thereto. For example, a display region that indicates the entire detection region may also be used. In addition, a configuration may also be adopted in which the icon is clearly shown to the driver using highlighted display such as blinking or any color. In addition, a notification may be performed using sound or the like in combination.

According to this embodiment, notification that uses the icons shown in FIGS. 6A to 7B is performed in step S406 in FIG. 4. In addition, an icon corresponding to the direction of a detected moving object continues to be displayed until it is determined that a certain period of time has elapsed in step S408. Note that, if the detection direction of the moving object changes while the vehicle 1 in steps S407 to S409 in FIG. 4 is in a stopped state, display of the icon may be switched according the change. In this case, the icon of the direction detected first may be continuously displayed.

In addition, notification shown in FIGS. 6A to 7B is displayed when driving assistance control is performed, and when the vehicle viewed from the above is only displayed without driving assistance control being performed, notification does not need to be performed. For example, when parking assistance control of driving assistance control is being performed, notification control shown in FIGS. 6A to 7B is performed. On the other hand, a configuration may be adopted in which, when the vehicle viewed from the above is only displayed without driving assistance control being performed, notification control shown in FIGS. 6A to 7B is not performed.

Specifically, a configuration may be adopted in which, on the touch panel display, a perspective image and a bird's-eye image are switched and displayed in accordance with the content of driving assistance control. With such a configuration, a configuration may also be adopted in which, when a perspective image is displayed, notification in FIGS. 6A to 7B is performed, and when a bird's-eye image is displayed, notification is not performed.

A configuration may also be adopted in which the above-described stopping control is executed only in a predetermined situation. For example, a configuration may be adopted in which, in an entering operation of parking assistance control such as those shown in FIGS. 3A and 3B, stopping control is executed when the entering operation is started or a turn is being made. Specifically, as shown in FIGS. 3A and 3B, when the entering operation is started or a turning operation is being performed, the vehicle 311 temporarily performs a stopping operation. In this case, a predetermined stopping time is provided. In this stopped state, a configuration may also be adopted in which, when an obstacle is detected in the surroundings, the vehicle is stopped during a predetermined time (for example, three seconds) for the obstacle being detected in addition to the predetermined stopping time when the entering operation is started or a turning operation is being performed, and movement is then started/restarted.

As described above, according to this embodiment, from a stopped state after a moving obstacle is detected during a driving assistance control operation, the driving assistance control operation can be restarted autonomously by the system. In addition, a stopping time is determined based on an obstacle detected first, and thus there is no waiting time that is more than necessary, thus reducing the burden for a passenger of the vehicle to wait. Furthermore, when a moving object is detected as an obstacle, it is possible to appropriately make a notification to the driver, and to prompt the driver to perform an operation of avoiding the detected obstacle.

According to the present invention, from a stopped state after a moving obstacle is detected while the system is performing a driving assistance control operation, the system can restart the driving assistance control operation.

Embodiment Overview

1. A driving assistance system according to the above embodiment is a driving assistance system (for example, driving assistance system 2) for a vehicle (for example, vehicle 1) according to the above embodiment, and includes:

a detection unit (for example, detection units 41 to 43) configured to detect information regarding surroundings of the vehicle; and a control unit (for example, 2) configured to perform driving assistance control based on information detected by the detection unit, wherein, when the control unit performs an operation of stopping movement due to an object detected by the detection unit during the driving assistance control, the control unit restarts the movement after a predetermined time elapses from when the stop operation is started.

According to this embodiment, from a stopped state after a moving obstacle is detected during a driving assistance control operation, the system can restart the driving assistance control operation. In addition, a stopping time is determined based on an obstacle detected first, and thus there is no waiting time that is more than necessary, reducing the burden for a passenger of the vehicle to wait.

2. According to the above embodiment, even if another object is detected by the detection unit during the stop operation, the control unit restarts the movement after the predetermined time elapses from when the stop operation is started.

According to this embodiment, a stopping time is determined based on an obstacle detected first, and thus there is no waiting time that is more than necessary, thus reducing the burden for a passenger of the vehicle to wait.

3. According to the above embodiment, when an object is detected by the detection unit after the movement is restarted, the control unit stops movement again.

According to this embodiment, even when movement is restarted from a stopped state, the vehicle can be stopped again.

4. According to the above embodiment, when an object is detected by the detection unit during a stopping operation that is performed through the driving assistance control, the control unit restarts movement through the driving assistance control after the predetermined time elapses in addition to a stopping time of the stopping operation.

According to this embodiment, the stopped state of the predetermined time is continued in consideration of the stopping time of the stopping operation that is performed through the driving assistance control, and it is possible to prompt the driver to notice an obstacle that is present in the surroundings.

5. According to the above embodiment, the driving assistance control is parking assistance control, and when an object is detected by the detection unit at a time of starting an operation through the parking assistance control or at a time of a turning operation, the control unit starts movement through the parking assistance control after the predetermined time elapses in addition to a stopping time at the time of starting the operation or the turning operation.

According to this embodiment, the stopped state of the predetermined time is continued in consideration of the stopping time of the stopping operation that is performed through the parking assistance control, and it is possible to prompt the driver to notice an obstacle that is present in the surroundings.

6. According to the above embodiment, the control unit is capable of executing steering control during a period from when a stop operation is started due to an object detected by the detection unit until when the movement is restarted.

According to this embodiment, as a result of permitting steering control when a stopped state is maintained, it is possible to smoothly shift to an operation that is performed after the stopped state is cancelled.

7. According to the above embodiment, a notification unit configured to perform a notification when the detection unit detects an object is further included, a plurality of detection units are provided, and the notification unit performs a notification in correspondence with the detection unit that detected the object.

According to this embodiment, when an obstacle is detected, it is possible to perform an appropriate notification.

8. According to the above embodiment, a display unit configured to include display regions respectively corresponding to the plurality of detection units is further included, and the notification unit causes the display unit to perform display so as to highlight a display region corresponding to the detection unit that detected the object.

According to this embodiment, when an obstacle is detected, it is possible to perform an appropriate notification corresponding to a detection unit that detected the obstacle.

9. According to the above embodiment, the display unit is capable of displaying display regions respectively corresponding to a plurality of detection units independently of activation of the driving assistance control, and the notification unit switches whether or not to perform the highlighting display in accordance with whether or not the driving assistance control is being performed.

According to this embodiment, notification is switched in accordance with whether or not driving assistance control is being performed, and it is possible to reduce the degree to which the driver feels troubled from notification.

10. A control method of a driving assistance system according to the above embodiment is a control method of a driving assistance system (for example, driving assistance system 2) for a vehicle (for example, vehicle 1), and includes:

detecting, by a detection unit (for example, detection units 41 to 43), information regarding surroundings of the vehicle, and performing driving assistance control based on information detected by the detection unit, and in the performing driving assistance control, when an operation of stopping movement is performed due to an object detected by the detection unit during the driving assistance control, the movement is restarted after a predetermined time elapses from when the stop operation is started.

According to this embodiment, from a stopped state after a moving obstacle is detected during a driving assistance control operation, the system can restart the driving assistance control operation. In addition, a stopping time is determined based on an obstacle detected first, and thus there is no waiting time that is more than necessary, reducing the burden for a passenger of the vehicle to wait.

The invention is not limited to the foregoing embodiments, and various variations/changes are possible within the spirit of the invention.

What is claimed is:

1. A driving assistance system for a vehicle, comprising:
   a detection unit configured to detect information regarding surroundings of the vehicle; and
   a control unit configured to perform driving assistance control based on information detected by the detection unit,
   wherein, when the control unit performs an operation of stopping movement due to an object detected by the detection unit during the driving assistance control, the control unit restarts the movement after a predetermined time elapses from when the stop operation is started,
   wherein, even if another object is detected by the detection unit during the stop operation, the control unit restarts the movement after the predetermined time elapses from when the stop operation is started.

2. The driving assistance system according to claim 1, wherein, when an object is detected by the detection unit after the movement is restarted, the control unit stops movement again.

3. The driving assistance system according to claim 1, wherein, when an object is detected by the detection unit during a stopping operation that is performed through the driving assistance control, the control unit restarts movement through the driving assistance control after the predetermined time elapses in addition to a stopping time of the stopping operation.

4. The driving assistance system according to claim 1, wherein the driving assistance control is parking assistance control, and
   when an object is detected by the detection unit at a time of starting an operation through the parking assistance control or at a time of a turning operation, the control unit starts movement through the parking assistance control after the predetermined time elapses in addition to a stopping time at the time of starting the operation or the turning operation.

5. The driving assistance system according to claim 1, wherein the control unit is capable of executing steering control during a period from when a stop operation is started due to an object detected by the detection unit until when the movement is restarted.

6. The driving assistance system according to claim 1, further comprising:
   a notification unit configured to perform a notification when the detection unit detects an object,
   wherein a plurality of detection units are provided, and
   the notification unit performs a notification in correspondence with the detection unit that detected the object.

7. The driving assistance system according to claim 6, further comprising:
   a display unit configured to include display regions respectively corresponding to the plurality of detection units,
   wherein the notification unit causes the display unit to perform display so as to highlight a display region corresponding to the detection unit that detected the object.

8. The driving assistance system according to claim 7, wherein the display unit is capable of displaying display regions respectively corresponding to a plurality of detection units independently of activation of the driving assistance control, and
   the notification unit switches whether or not to perform the highlighting display in accordance with whether or not the driving assistance control is being performed.

9. A control method of a driving assistance system for a vehicle, the method comprising:
   detecting, by a detection unit, information regarding surroundings of the vehicle, and
   performing driving assistance control based on information detected by the detection unit,
   wherein, in the performing driving assistance control, when an operation of stopping movement is performed due to an object detected by the detection unit during the driving assistance control, the movement is restarted after a predetermined time elapses from when the stop operation is started,
   wherein, in the performing driving assistance control, even if another object is detected by the detection unit during the stop operation, the movement is restarted after the predetermined time elapses from when the stop operation is started.

10. A driving assistance system for a vehicle, comprising:
    a detection unit configured to detect information regarding surroundings of the vehicle; and
    a control unit configured to perform driving assistance control based on information detected by the detection unit,
    wherein, when the control unit performs an operation of stopping movement due to an object detected by the detection unit during the driving assistance control, the control unit restarts the movement after a predetermined time elapses from when the stop operation is started,
    wherein, when an object is detected by the detection unit after the movement is restarted, the control unit stops movement again,
    wherein, when the control unit performs an operation of stopping movement again, the control unit restarts the movement after a second predetermined time that is shorter than the predetermined time elapses from when the stop operation is started again.

* * * * *